(12) United States Patent
Strand et al.

(10) Patent No.: US 6,779,245 B1
(45) Date of Patent: Aug. 24, 2004

(54) BEARING REINFORCEMENT IN LIGHT METAL HOUSING

(75) Inventors: Kent Strand, Linköping (SE);
Sven-Åke Karlsson, Linköping (SE);
Stefan Ekblad, Nödinge (SE)

(73) Assignee: Saab AB, Linkoping (SE)

( * ) Notice: Subject to any disclaimer, the term of this patent is extended or adjusted under 35 U.S.C. 154(b) by 0 days.

(21) Appl. No.: 10/276,684

(22) PCT Filed: May 17, 2000

(86) PCT No.: PCT/SE00/00981
§ 371 (c)(1),
(2), (4) Date: Mar. 19, 2003

(87) PCT Pub. No.: WO01/87520
PCT Pub. Date: Nov. 22, 2001

(51) Int. Cl.$^7$ .................. B22D 11/126; B23P 17/00
(52) U.S. Cl. .................. 29/527.6; 29/557; 29/888.01; 29/898; 29/898.14; 409/131
(58) Field of Search .................. 29/527.6, 527.5, 29/558, 557, 888.01, 898.15, 898.14, 898, 898.049, 898.05; 409/131

(56) References Cited

U.S. PATENT DOCUMENTS

| | | | | |
|---|---|---|---|---|
| 3,848,310 A | * | 11/1974 | Steinback | 29/894.362 |
| 4,157,607 A | * | 6/1979 | Ernest | 29/888.06 |
| 4,705,092 A | * | 11/1987 | Ito et al. | 164/34 |
| 4,908,923 A | * | 3/1990 | Anderson et al. | 29/888.01 |
| 4,996,025 A | * | 2/1991 | Pratt et al. | 420/554 |
| 5,008,158 A | * | 4/1991 | Fang et al. | 428/614 |
| 5,288,186 A | * | 2/1994 | Kovacevic | 409/131 |
| 5,507,258 A | | 4/1996 | Sasaki | |
| 5,534,044 A | | 7/1996 | Prasad et al. | |
| 5,637,030 A | * | 6/1997 | Chopra et al. | 451/39 |
| 5,758,999 A | * | 6/1998 | Geise | 409/231 |
| 5,765,667 A | * | 6/1998 | Ross et al. | 188/218 XL |
| 5,967,400 A | * | 10/1999 | Bell et al. | 228/124.5 |

(List continued on next page.)

FOREIGN PATENT DOCUMENTS

| | | | | |
|---|---|---|---|---|
| DE | 4033853 | | 5/1991 | |
| DE | 4244502 | | 3/1994 | |
| GB | 2273967 | | 7/1994 | |
| JP | 62/278308 | | 12/1987 | |
| JP | 4021735 | | 1/1992 | |
| JP | 05057387 A | * | 3/1993 | B21D/53/86 |
| WO | WO 01/87524 A1 | * | 11/2001 | B23B/35/00 |

OTHER PUBLICATIONS

Conference paper: 30$^{th}$ ISIATA, ISBN 0–947719–94–6, Materials for Energy–Efficient Vehicles; Paint and Powder Coating Application in the Automotive Industries, Jun. 1997, pp. 445–452.

*Primary Examiner*—Essama Omgba
(74) *Attorney, Agent, or Firm*—Swidler Berlin Shereff Friedman, LLP

(57) ABSTRACT

Bearing reinforcement for a shaft (3) mounted in bearings in a cast light-metal housing (1, 2) such as an engine block or a gearbox housing, in which an insert (5) that forms a bearing seat for the shaft (3) is made of an MMC material, i.e. a metal matrix composite, and in which the base material of the MMC material consists of the same metal as the metal that comprises the principal component in the light-metal housing, wherein the MMC material of the insert (5) is reinforced with 10-70% ceramic material by volume in the form of particles or fibers. The invention also describes a method for fabricating inserts (5) in which they are formed into a bar having the same cross-section as the radial cross-section of the insert, whereupon separate inserts are cross-cut from the bar by means of high-speed machining or water cutting.

3 Claims, 1 Drawing Sheet

U.S. PATENT DOCUMENTS 6,051,045 A * 4/2000 Narula et al. .................. 72/233
6,102,635 A * 8/2000 Strand et al. ............... 409/131
6,286,210 B1 * 9/2001 Ruckert et al. ........ 29/888.061
6,293,741 B1 * 9/2001 Strand et al. ............... 409/131
6,617,271 B1 * 9/2003 Kodash et al. ................. 501/87
6,684,500 B1 * 2/2004 Kohlhase et al. ......... 29/888.08
2002/0076286 A1 * 6/2002 Dahl et al. .................. 409/131
2003/0152432 A1 * 8/2003 Meece et al. ............... 409/132

* cited by examiner

BEARING REINFORCEMENT IN LIGHT METAL HOUSING

This application is a 371 of PCT/SE00/00981 filed May 17, 2000.

TECHNICAL FIELD

The invention concerns bearing reinforcements for shafts that are mounted on bearings in a cast light-metal housing, e.g. an engine block, gearbox housing or the equivalent, in which inserts that form the bearing seats for the shafts are cast in the light-metal housing, wherein the inserts are made of an MMC (Metal Matrix Composite) material of a type such that the base metal of the MMC material is the same as the base metal that constitutes the principal component in the material that forms the light-metal housing.

STATE OF THE ART

The engine blocks and cylinder heads in modern combustion engines are often made of aluminum alloys in order to save weight. The difference in terms of thermal expansion between Al alloy, ca. 22 ppm/° K. in an engine block, and steel, ca. 12 ppm/° K. in, e.g. crankshafts mounted in the main bearings in the engine block entails disadvantages in terms of the ability to control the radial play present in the crankshaft bearings. Because the bearing seat in the Al block contracts more at low temperatures than the steel shaft, sufficient radial play must be present to prevent the shaft from seizing. This play increases at operating temperature of the engine. It can lead to difficulties in maintaining a proper lubricant film at the bearing within the entire temperature range of the engine, i.e. −30° C. to +150° C. The increased radial play at higher temperatures can also cause crankshaft vibrations. In the present state of the art, this problem is addressed by casting inserts of iron-based material in the block at the bearing seats. However, this approach is encumbered by problems in the form of, e.g.:

insufficient binding between the different materials, dissimilarities in terms of workability, incompatibility in connection with reuse.

The temperatures are high beneath the hood of a modern car, and once the engine has reached its operating temperature the transmission can also be subjected to temperatures ranging from −30° C. to +150° C. To save weight, aluminum alloys are being used to an ever-increasing extent in gearbox housings and other similar components. Because of the high thermal expansion exhibited by these aluminum alloys, this large operating temperature range can lead to design problems in connection with gear play (play between tooth gear flanks) and grip in rolling-element bearings in the gearbox (refers to the grip between housing and bearing that holds the bearing in place). At low temperatures, the center distances between the shafts arranged in the gearbox are low, which requires that there be sufficient gear play between the drive gears on two different shafts when these drive gears are brought into mutual engagement. However, there cannot be so much play between the gears that it results in noises and abrasion at high operating temperatures, when the center distance between two such shafts is greatest.

In a similar way, the rolling-element bearings for the shafts in the gearbox housing require sufficient play at low temperature while, at the same time, the amount of play present must not be excessive at the operating temperature of the gearbox. This is difficult to achieve while simultaneously meeting the requirement that the bearings maintain their grip in the housing throughout the entire temperature range. There is no known solution to this problem. This problem can be expected to become worse as the temperatures under vehicle hoods become higher in the future, at the same time as heavier demands are made in terms of transmission efficiency. The demand for lower vehicle fuel consumption provides the impetus in both cases.

The use of MMC material is proposed in the invention described below. Commercial interest in structural materials of the type known generally as MMCs ("metall-matris-kompositer" in Swedish) increased during the 1990s. MMC materials are composites that consist of a binding material in the form of a metal, usually a light metal such as aluminum, magnesium, titanium or alloys thereof, which is reinforced via the admixture of fibers or particles in the form of ceramic substances such as silicon carbide, boron carbide or aluminum oxide. MMCs can also consist of steel produced by power metallurgy and reinforced with titanium carbide. MMC materials exhibit extremely interesting properties, which can be further adapted depending on the area of application, thereby offering advantages in that the component can be made lighter, stronger, stiffer and possessing better fatigue properties than can be achieved using conventional materials within the specific area of application in question.

One significant disadvantage associated with the use of MMC materials is that they are very difficult to machine. To create a component made of MMC material, methods are usually used in which the component is cast in a shape that is closely akin to the final shape of the component. Another method involves using a forged billet or a piece of extruded bar, so that spark machining of the surface and conventional cutting techniques can be used to produce the final component shape. Attempts have been made to produce e.g. connecting rods for motorcycles by means of such conventional fabricating and machining methods. In this way, the goal of achieving the desired component and its desired properties, such as lower weight, has been achieved, and the use of such connecting rods in an engine has resulted in an engine that turns more readily and vibrates less. However, the problem is that the cost of producing engine components by conventional means has been extremely high, thereby limiting use to areas where cost is of lesser importance.

A number of patents document various methods for the final forming of components based on MMC materials. U.S. Pat. No. 5,765,667 may be cited as an example of such a patent, wherein a method is described for fabricating a component, in this case a brake disk, by casting to a format that is as close as possible to the shape of the finished component in order, as is clearly described, to avoid the need for machine cutting to the greatest possible extent. It is obvious to one skilled in the art to avoid the need for cutting operations, since the MMC material contains, when consisting of e.g. an aluminum base and reinforcing particles of silicon carbide, the very substances that are commonly used to grind cutting tools. The silicon carbide particles imbedded in the MMC material have a destructive effect on cutting tools when conventional cutting methods are used, since the edges of the cutting tools are rapidly worn down by the abrasive particles in the composite material.

Patent application PCT/SE/02007, which was not yet published at the time of the submission of the present application, presents a method that shows that MMC materials can be machined by HSM (High-Speed Machining), and this method was used in the fabrication of products related to the present invention. Everything described in patent application PCT/SE/02007 is hereby incorporated into the present patent application.

DESCRIPTION OF THE INVENTION

Patent application PCT/SE/02007, which was not yet published at the time of the submission of this application, presents a method that shows that MMC materials can be machined by HSM (High-Speed Machining), and this method was, among others, used in the fabrication of products related to the present invention. Everything described in patent application PCT/SE/02007 is hereby incorporated into the present patent application.

One aspect of the invention pertains to a bearing reinforcement for a shaft that is mounted in a cast light-metal housing, such as an engine block, a gearbox housing or the equivalent, in which inserts that form the bearing seats for the shafts are cast in the light-metal housing, wherein the inserts are made of an MMC (Metal Matrix Composite) material of a type such that the base metal of the MMC material is the same as the base metal that constitutes the principal component in the material that forms the light-metal housing.

According to another aspect of the invention, a method is described for fabricating an insert made of MMC material for casting in a light-metal housing to form a bearing seat and thus achieve a bearing reinforcement as per the foregoing in which the inserts are created by extruding a billet of MMC material to produce a bar with a profile whose cross-section essentially corresponds to that of the finished insert. The inserts are then cross-cut from the extruded bar by cutting via high-speed machining, HSM, as defined below and in patent application PCT/SE/02007. Other methods, such as water cutting, can also be used to cross-cut the bar material into separate inserts.

Using an aluminum-based metal matrix composite, MMC, in cast inserts for the bearing seats in an engine block made of aluminum alloy, it is possible to achieve thermal expansion similar to that of the steel used in the shaft at the bearing seat with materials that match the material in the engine block in terms of compatibility during casting, future reuse of the engine block, and that can be machined using similar techniques.

Additional advantages afforded by using MMC materials at the aforementioned points consist in that their high modulus of elasticity contributes to a rigid design that retains the low weight of aluminum. High abrasion resistance reduces damage from erosion between the insert and the outer surface of the bearing casing.

The described technique is naturally applicable to bearing seats in light-metal housings for other types of shafts, such as balance shafts and camshafts in engine blocks, or shafts in gearboxes.

Yet another advantage of using cast inserts made of MMC material as bearing reinforcements in light-metal housings as per the foregoing is that the position of the shaft center line is maintained in that the play between shaft and bearing housing is reduced. This also extends the useful life of the oil used to lubricate the bearings.

One means of reducing fuel consumption in future vehicles is to replace aluminum with magnesium as the principal component in light-metal housings in combustion engines and gearboxes. The fact that the coefficient of linear expansion for magnesium is even higher than for aluminum, and that the modulus of elasticity for magnesium is much lower than for aluminum, provides even greater justification for use MMC inserts as bearing reinforcements in this case. In fact, the use of MMC inserts according to this aspect of the invention could be what makes it possible to use magnesium-based light metals in engine blocks for combustion engines, and in gearbox housings.

The foregoing assertions concerning the use of MMC inserts apply to all types of means of conveyance, i.e. not only within the automobile industry, but to an equally great extent in e.g. airplanes and helicopters.

DESCRIPTION OF EMBODIMENTS

A number of exemplary embodiments of the invention are described below with reference to the accompanying figures.

Figure 1:
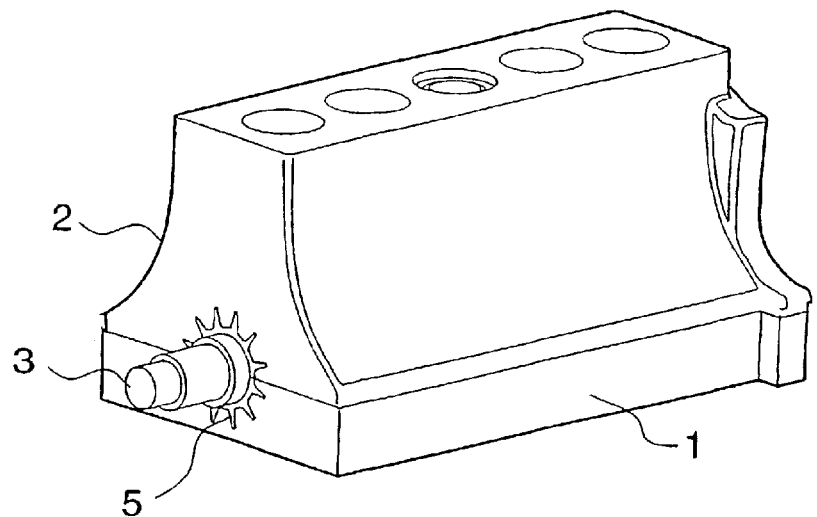
FIG. 1 shows an engine block for a combustion engine in which a reinforcement of the bearing seat for the crankshaft has been cast in engine block material.
Figure 2:
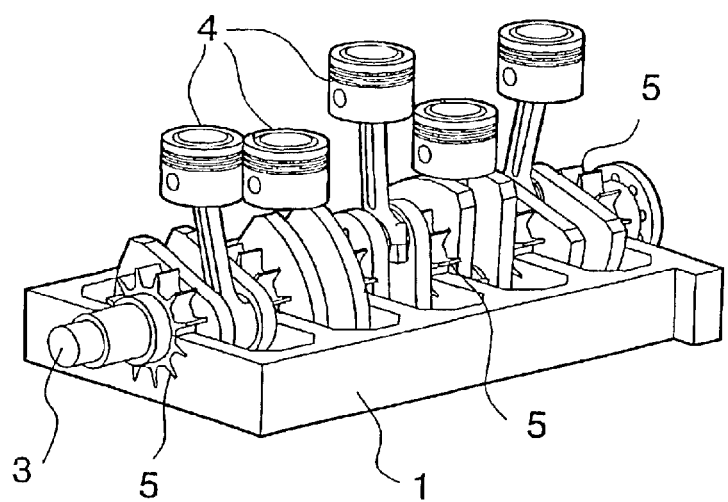
FIG. 2 shows the lower part of an engine block, i.e. the crankshaft bearing bridge, where inserts made of MMC material are shown cast for all the bearing seats.

FIG. 1 shows an example of an engine block for a combustion engine. It is assumed here that the engine block is made of some light metal, either aluminum or magnesium, or of some light-metal alloy based on such a light metal. In the example described here, it is assumed that the engine block is made of aluminum or of an alloy that contains aluminum as its principal component. In the example shown, the engine block is divisible into two parts, a lower part referred to as the crankshaft bearing bridge 1, and an upper part referred to here as the cylinder block 2. A crankshaft 3 is mounted in the engine block in, as shown in FIG. 2, bearing seats along the crankshaft 3. The pistons mounted on the crankshaft are designated as 4.

Figure 3:
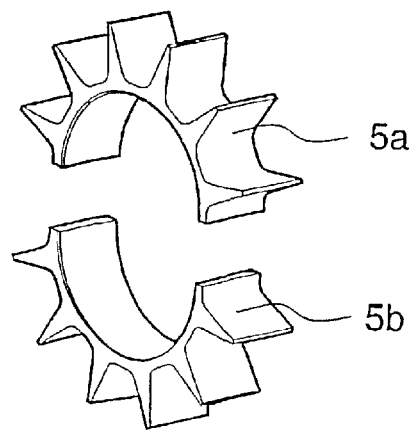
FIG. 3 shows a two-part insert made of MMC material for casting in a light-metal housing to reinforce a bearing seat for a rotating shaft.

It is advantageous to reinforce the bearing seats for bearings in which rotating shafts in the engine block are mounted in seats that reside in the material of the engine block. For the reasons enumerated above, it is proposed according to the invention that these reinforcements consist of inserts 5 that are made of an MMC material. The inserts (3) are made of an MMC material that is based on the same base metal as that on which the engine block is based, i.e. aluminum in this case. This means that the MMC material in this example has aluminum as its base material while, on the other hand, the reinforcing material consists of an arbitrary ceramic material in particle form, particles or fibers, which consists of e.g. silicon carbide, boron nitride or aluminum oxide mixed into the MMC material, with the proportion of ceramic material accounting for 10% to 70% of the MMC material by volume. A good material match between the engine block and the inserts is thereby achieved. The inserts are cast in the engine block when it is formed. In this context it is appropriate, as shown in FIG. 3, to fabricate the inserts 5 as half rings, whereupon insert halves 5*a* and 5*b* are cast respectively into the upper and lower parts of the light-metal housing that the engine block comprises. In this example, a group of insert halves 5*a* is thus cast in the crankshaft bearing bridge 1, while the corresponding group of insert halves 5*b* is cast in the cylinder block 2. As the figures show, the surfaces of the inserts 5 are extensive on the side of the inserts that faces toward and has contact with the material of the light-metal housing in which the inserts 5 are cast. This produces a large contact area between insert 5 and material. An insert half can have a higher volume percentage of reinforcement nearest the bearing cup and be nonreinforced/less reinforced in the surface facing the material of the light-metal housing. This can be achieved via, e.g. co-extrusion.

The principle of the invention as it pertains to an engine block based on the light metal aluminum is illustrated in the example. As noted, the light-metal housing can just as well consist of a gearbox housing or other equipment housing. Correspondingly, the base material in the inserts 5 can be replaced with magnesium if the light metal in the housing in which the inserts are cast contains magnesium as its base material.

In fabricating an insert made of MMC material for casting in a light-metal housing to produce a bearing seat and thereby achieve bearing reinforcement as per the foregoing, a method is used in which the inserts are created by extruding a billet of the selected MMC material into a bar with a profile whose cross-sections essentially corresponds to that of the finished insert. The inserts are then cross-cut from the extruded bar by cutting via high-speed machining, HSM, as defined below and in patent application PCT/SE/ 02007.

When fabricating inserts for casting in light-metal housings that are divided along a partition line as per FIG. 1, it is appropriate to extrude a bar with a profile as per insert half 5a in FIG. 3. It is then necessary only to crosscut the bar material into inserts of suitable width. Cross-cutting can be performed using milling tools such as side-milling cutters, saw blades or band saws. As noted, water cutting can also be used.

One aspect of the invention is based on a method of working a billet of MMC material by means of what is referred to here as HSM, or High-Speed Machining, and a component can be given its final form directly from the billet by means of this method. The billet can be forged, cast or sintered, or may consist of a piece of extruded bar or a raw material produced in some other way.

High-speed machining is characterized in that the cutting tool achieves extremely high speeds in relation to the machined billet in comparison with conventional techniques. The cutting tools in this context are preferably milling tools and drills, but may also consist of e.g. saw blades, side-milling cutters, etc.

In this document, the term high-speed machining (HSM) is used to denote a method that differs from conventional machining methods. It so happens that this term is also sometimes used to denote conventional machining in which new methods are being developed to push the limits of conventional machining data upwards. This is not the sense of the term as it is used herein.

HSM is characterized by:
extremely high cutting speeds
a high rate of shear elongation (ability to separate a cutting from the billet)
a very high power density is achieved in front of the cut (typical values: $MW/mm_3$)
extremely high local temperatures prevail at the cutting point during the cutting-producing process
the cuttings flow without coming into contact with the cut,
the cutting forces tend asymptotically toward zero.

The following examples of the high cutting speeds associated with the machining of various substances may be noted:
aluminum: ca. 3000 m/minute (conventionally ca. 100–400 m/minute),
titanium: ca. 15,000 m/minute (conventionally ca. 15–100 m/minute).

Finding the right cutting speed to produce the foregoing conditions that characterize HSM thus depends entirely on the material to be machined. The cutting forces can be studied in connection with testing to determine the optimum cutting speed for HSM of a new material. These forces tend asymptotically toward zero as the criteria for HSM conditions are met. HSM conditions may thus be said to prevail when the cutting forces are diminishing. Under such conditions, it then remains to determine an optimum cutting speed for the material being machined. In conventional machining, the cutting forces increase with increasing cutting speeds.

Yet another advantage of using HSM is that the cuttings absorb the bulk, typically about 80%, of the heat generated at the cutting point, so that a work piece will be left largely unaffected by the heat generated during machining.

HSM has been shown to yield unexpectedly good results when used on MMC materials. Despite the high proportion of abrasive particles in such material, the cutting tools are found to retain their sharpness for a long time, as though unaffected by the abrasives in the MMC material. The reason for this has not been fully explained, since the internal process, i.e. what actually happens to the MMC material at the cutting point during machining, is not entirely understood. One theory is that a cutting being cut from the material is brought to some extent into a liquid state in a small area immediately in front of the edge of the cutting tool, and that the abrasive particles imbedded in the material in the form of e.g. silicon carbide, boron carbide or aluminum oxide are carried away in the molten material and thus do not come into direct contact with the cut. This could explain why the cutting tools retaining their sharpness, in direct contrast to what occurs during conventional cutting operations.

A number of tests have been conducted to evaluate the method according to the invention. Among other tests, a flange was produced from a raw billet of an MMC material, with a mill being used to remove all the material from the raw billet around the remaining flange. The flange in this case was L-shaped, with a final thickness of 1 mm of material, and the sides of the flange measured 45 and 15 mm, respectively. The values used during the machining in this example were: spindle speed 15,000 rpm, cutting speed 565 m/minute and feed speed 300 mm/minute. It took 2.5 minutes to create the flange. The tool life of the cutting tool was measured in hours: The proportion of SiC in the material was 40% in this example.

Tests were also conducted in which holes were drilled in MMC material containing 40% SiC. A number of holes were drilled using 6.9 mm HM drills, with a spindle speed of 15,000 rpm and a feed speed of 3000 mm/minute. The drill tool life was such that one drill could be used to drill 1000 holes.

In another example, a connecting rod was made directly from a bar billet of MMC that was machined into its final form using HSM. The cost of e.g. a connecting rod made of MMC is low, and it also offers the following advantages over connecting rods made of other materials:

relative to steel: lower mass, better heat conduction
relative to titanium: lower mass, higher stiffness, better heat conduction
relative to aluminum: higher stiffness, higher yield point, higher fatigue strength, coefficient of thermal linear expansion like that of steel in a connected connecting rod
relative to fiber composite: lower price, isotropic properties, coefficient of thermal linear expansion like that of steel in a connected connecting rod, better heat conduction.

The good results obtained in connection with machining according to the proposed method were produced using cutting tools of coated hard metal with internal duct cooling, and with diamond tools. When diamond tools are used, the tool lives of the tools are long at carbide contents of up to 40% in the MMC material. Good results are still obtained at carbide contents of as high as 70% in the MMC material.

The method according to the invention is applicable to all types of components that are to be made from MMC materials in cases where machine cutting is feasible in view of the final shape of the component. The method is thus not limited to the depicted embodiments, but can be used in connection with any components where the choice of MMC as the material is advantageous.

What is claimed is:

1. A method for fabricating an insert for bearing seats for shafts mounted in bearings in a cast light-metal housing comprising:

providing a billet of an MMC material containing 10–70% ceramic material by volume in the form of particles or fibers, forming from the billet a bar with a cross-sectional profile that essentially coincides with an entire cross-sectional profile of the insert, or coincides with a cross-sectional profile of a section of the insert, and cross-cutting the bar to form separate inserts by high-speed machining, wherein the high-speed machining is characterized in that cutting forces at an edge of the cut diminish with increasing cutting speed, whereupon pieces cross-cut from the bar constitute all or parts of an insert.

2. A method according to claim 1, characterized in that the billet of MMC material is formed into said bar by extrusion, casting, sintering or forging.

3. A method according to claim 1, characterized in that cutting tools for high-speed machining include one or more of mills, drills, side-milling cutters, saw blades or bands saws.

* * * * *